Figure 1:
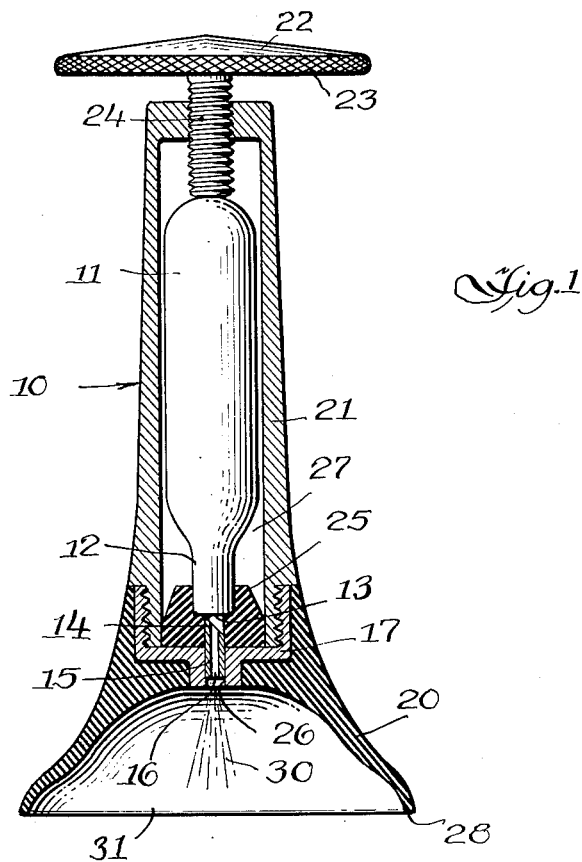

June 30, 1964     C. CAPLAN ETAL     3,138,803

PRESSURIZED PLUNGER

Filed March 28, 1962

Inventors,
Charles Caplan
Irving Mandell
and Daniel J. Smith,
By Schneider, Dressler, Goldsmith & Clement, Attys.

United States Patent Office 3,138,803
Patented June 30, 1964

3,138,803
PRESSURIZED PLUNGER
Charles Caplan, 422 Vine Court, Wilmette, Ill.; Irving Mandell, 7500 Kenneth, Skokie, Ill.; and Daniel J. Smith, 7537 S. Kingston Ave., Chicago, Ill.
Filed Mar. 28, 1962, Ser. No. 183,226
2 Claims. (Cl. 4—255)

This invention relates to a plunger for clearing an obstruction from a pipe, such as a drain pipe in a plumbing system, and more particularly to such a plunger that relies primarily upon pressurized gas to remove the obstruction.

Summary of the Invention

The apparatus of this invention comprises support means for a compressed gas cartridge; puncturing means to produce an opening of restricted size in the cartridge; a sealing member, such as a suction cup, having an orifice through which the resulting narrow stream of gas can pass; and means to operate the puncturing means and direct the resulting escaping stream of gas, without substantial enlargement of the cross section of the stream, into the orifice of the suction cup or other sealing member. In the preferred embodiment of the apparatus an air stream guide member having a narrow elongated passageway therethrough, and means to cause the stream of gas from the punctured cartridge to pass directly into the passageway of that guide member, are included between the compressed air cartridge and the orifice of the sealing member.

The method of this invention comprises the steps of confining a quantity of air, at a pressure not substantially greater than one atmosphere, immediately adjacent the end of the pipe to be cleared; confining a second quantity of a gas such as air at a pressure several times greater than atmospheric pressure; releasing a narrow stream of the pressurized gas; directing this narrow stream, without substantial enlargement of the cross section of the stream, into the confined air adjacent the pipe end; and directing the stream of gas from there into the pipe.

It has been believed that it is impossible successfully to introduce a gas compressed at high pressure directly from a cartridge in which it is confined into the suction cup of a plunger and from there into the pipe to be cleared of an obstruction. It has therefore been thought that it was necessary to permit any compressed gas that is used in clearing an obstructed pipe to expand so as greatly to reduce its pressure before introducing it into the suction cup of the plunger and into the pipe.

One reason for this appears to be that it was believed that introduction of air under greater pressure would break the pneumatic seal between the edge of the suction cup and the wall of the basin, for example, that abuts the opening of the plumbing pipe to be treated. Another reason has been that it was believed that air under too great pressure might damage the plumbing instead of removing the obstruction.

In accordance with the present invention, it has been found not only possible, but desirable, to employ a narrow stream of gas under high pressure, so long as the cross-sectional area of the moving stream of gas is kept quite small until it is introduced into the space within the suction cup or other sealing member.

The Drawing

Figure 2:
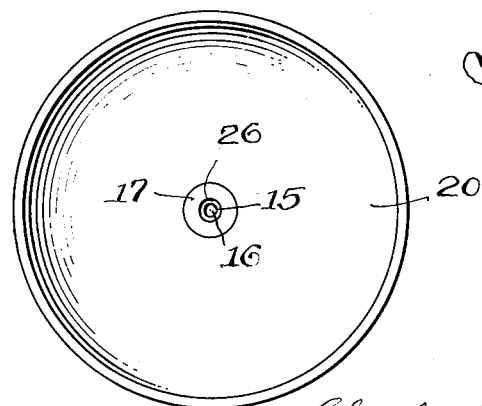

This invention will be further described in connection with the drawing of this application, in which:
FIGURE 1 is a cross-sectional view of one embodiment of the apparatus of this invention; and
FIGURE 2 is a bottom plan view of the same embodiment of the apparatus.

Apparatus Disclosed

FIGURE 1 shows a cross-sectional view of plunger 10 as one embodiment of the apparatus of this invention.

Cartridge 11 is a conventional, small, high pressure, gas-containing cartridge such as is commonly used for storing air, carbon dioxide, or the like under pressures several times atmospheric pressure, i.e., about 45 p.s.i.a. (30 p.s.i.g.) or higher. It will be understood that the higher the pressure, the greater the force of the narrow stream of escaping gas which is employed in this invention. We have found that air, for example, compressed at about 100 p.s.i.g. provides a suitable source of compressed gas for use with this invention.

Cartridge 11 terminates at its lower end in neck 12, the wall of which defines mouth 13 at the end of the neck. After cartridge 11 is filled with a compressed gas, mouth 13 must, of course, be plugged with a closure member to confine the compressed gas.

The closure member for mouth 13 must be of a type readily ruptured by puncturing means 14, which in the embodiment shown is the sharpened upper end of air stream guide member 15. When puncturing means 14 has been fully inserted into the closure member in mouth 13, compressed air from cartridge 11 is caused to escape through narrow elongated passageway 16 in air stream guide member 15.

As will be seen, passageway 16, which determines the cross-sectional size of the narrow stream of gas escaping from cartridge 11, must be of restricted size as compared to the main transverse cross-sectional area of the cartridge, or else the compressed air will escape as a sudden explosion rather than as a well defined stream of gas. On the other hand, it is also clear that the opening must not be made so small that it will fail to provide a stream of gas which can apply sufficient force to the obstructed pipe to remove whatever obstruction is lodged in the pipe. It has been found that an opening 16 having a cross-sectional area about 0.01 the main transverse cross-sectional area of cartridge 11 produces a very effective air stream.

Air stream guide member 15 is supported in internally threaded nipple 17 attached to sealing member 20 (in the embodiment shown, a suction cup) at the center thereof. Cartridge support means 21 extends upwardly from nipple 17 and is threaded into it.

Hand lever 22, with knurled edge 23, is in threaded engagement at 24 with the upper end of support means 21. As will be seen, by turning hand screw 22 clockwise, cartridge 11 is pressed downward and the closure member of mouth 12 thereof is pushed against puncturing means 14 to produce an opening of restricted size in the closure member.

In the embodiment shown, gasket 25, nested in the bottom end of support means 21, provides an airtight seal around neck 12 of cartridge 11 and around air stream guide member 15. Gasket 25 is formed of a relatively soft material, such as rubber, so that as advancing hand screw 22 pushes neck 12 farther down around puncturing means 14, the gasket adapts itself to the advancing neck. Until neck 12 has advanced far enough to surround entirely the tapered end of member 15 which constitutes puncturing means 14, gasket 25 acts to confine the stream of gas from the punctured cartridge and to introduce it directly into the upper or inlet end of passageway 16 of air stream guide member 15.

Passageway 16 through guide member 15 is preferably straight, and preferably has a length several times its width. This form of passageway will help to keep the narrow stream of gas as well defined as possible after it enters the space within sealing member or suction cup 20 and continues on into the pipe to be cleared of obstruction.

The plunger of this invention operates efficiently if instead of employing guide member 15 the escaping air stream from cartridge 11 is introduced directly into a small orifice 26 in suction cup 20, preferably having dimensions no greater than those which would be employed for passageway 16 if air stream guide member 15 were present. In such case, puncturing means 14 could be made integral with threaded nipple 17, if desired.

Gasket 25 may be omitted if the puncturing of cartridge 11 is carried out rapidly enough that neck 12 can be pressed down very quickly around puncturing means 14, so that no substantial amount of compressed air is permitted to escape into space 27 around cartridge 11, or from there into the surrounding atmosphere. As will be seen from FIGURE 1, when neck 12 has been pushed down so that it entirely surrounds the tapered portion of puncturing means 14, the stream of air escaping from cartridge 11 continues with substantially the same cross-sectional area until it passes into the space within suction cup 20.

The pipe from which an obstruction is to be cleared by use of the plunger of this invention is frequently a drain pipe leading from a sink or basin in a domestic plumbing system. In such case, the bottom wall of the sink extends outwardly from the top, open end of the pipe, and abuts the pipe end. Generally hemispherical, flexible suction cup 20, formed of a resilient material such as rubber, is adapted to fit snugly against the abutting walls of the sink, basin or other receptacle. When the user of the plunger presses against hand screw 22, and through this against support member 21, this in turn presses outer edge 28 of the bell shaped suction cup tightly against the abutting receptacle walls to form an airtight seal with the walls.

Sealing member 20 may if desired be formed of a resilient material in any shape that will confine a quantity of air immediately adjacent the exposed, open end of the pipe to be cleared. Thus, for example, the sealing member may be in the form of a ring, gasket or washer, so long as it is adapted to fit snugly against the walls of the sink or other receptacle which abut the pipe opening. It may be in the form of a tapered plug (which would of course confine a smaller volume of air—actually only the air within the plug—adjacent the pipe end). When a plug is used, the variety of sizes of pipes that the device will fit will be more limited than with a suction cup or a gasket type sealing member.

As indicated above, in the embodiment shown in FIGURES 1 and 2 passageway 16 in effect defines the orifice through suction cup 20. A narrow stream of air 30 passes through passageway 16 and into the space defined by cup 20, and air from that stream is introduced into the pipe from which the obstruction is to be cleared. In use, passageway 16 and orifice 26 are aligned directly with the longitudinal axis of the pipe to be cleared, so that stream 30 is also thus aligned with that axis.

The cross-sectional area of the orifice through suction cup 20 is preferably about 0.001 of the cross-sectional area of the mouth 31 of cup 20.

*Operation of Apparatus*

When the plunger of this invention is to be used in clearing an obstruction from, for example, the drain pipe of a kitchen sink, the plunger is put in operative position with suction cup 20 centered over the drain pipe. The user then presses down against hand screw 22 in order to confine a quantity of air at a pressure not substantially greater than one atmosphere in the space within cup 20.

In the second step of using this plunger, hand screw 22 is turned to force cartridge 11 down against puncturing means 14. This action releases a stream of air 30 which passes through passageway 16 and into the air confined within suction cup 20. Air from that stream then passes into the pipe and drives the obstruction from the pipe.

The narrow character of the stream of gas that escapes from cartridge 11 and passes through the suction cup avoids the defects that have long been thought unavoidable with pressurized plungers. Although the air stream applies sufficient force to loosen most obstructions likely to be found in domestic plumbing pipes, the concentration of that force is what appears to accomplish this objective, and the total force applied is thus not so great as to push the suction cup out of engagement with the surrounding wall of the basin or sink. Likewise, the total force applied by the stream is not so great as to be likely to result in damage to the plumbing. The inertia of the high pressure, forcefully propelled narrow stream appears to be effective in helping to maintain the integrity of the stream and to minimize the chances of the stream becoming so diffused as to lose its effectiveness in clearing obstructions.

When the cartridge 11 and gasket 25 cooperate, as in the embodiment shown in the drawing, to make rubber suction cup 20 airtight even before neck 12 has moved down to entirely surround the tapered portion of puncturing means 14, the operation of the plunger of this invention can be improved still more by a few preliminary up-and-down strokes with the plunger similar to the manner of operation of a conventional manually operated rubber plunger. It is believed that these preliminary strokes have three results. First, as with a conventional plunger, the movement of the plunger tends to loosen solids which may be jammed in the obstructed pipe. Second, the partial vacuum created inside the suction cup helps the operator of the pressurized plunger to hold cup edge 28 against the walls abutting the pipe opening, and thereby to avoid leakage of air from inside the cup. Third, with a partial vacuum inside suction cup 20, air stream 30 probably meets with somewhat less resistance in passing through the space defined by the cup, and therefore probably retains a larger portion of its original force and physical integrity as a discrete stream of air molecules.

Use of the plunger of this invention in the manner described has proved very successful in clearing obstructed pipes of various types of matter with which the pipes are clogged.

The above detailed description has been given for clearness of understanding only. Modifications of the invention as thus described will be obvious to those skilled in the art.

We claim:

1. A pressurized plunger for clearing an obstruction from a pipe that has an exposed, open end communicating with a receptacle, said receptacle having walls abutting said open pipe end, which comprises: (1) means for supporting a cartridge of compressed gas, said cartridge having an outlet neck terminating in a closure member; (2) a resilient sealing member attached to the cartridge supporting means and adapted to fit snugly against said abutting receptacle walls to form a substantially airtight seal therewith, said sealing member having an orifice therethrough; (3) an air stream guide member positioned between the cartridge and the sealing member, said air stream guide member carrying means for puncturing said neck closure of the cartridge to produce an opening of restricted size and cause a narrow stream of gas to escape therefrom, and having a narrow elongated passageway therethrough, said passageway having an inlet end and an outlet end, said inlet end being adapted to communicate directly with said restricted opening after the opening is completely formed by action of the puncturing means, and said outlet end communicating with the orifice of the sealing member; (4) means carried by the cartridge supporting means and the sealing member for bringing the cartridge and the puncturing means into operative engagement and (5) resilient means for confining in a space no larger in cross-section than the external cross-sectional area of said puncturing means, for any period of time during which the puncturing means has not yet fully pierced said neck closure, the stream of gas from the punctured cartridge, and for introducing said stream of gas directly into the inlet end of the air stream guide member passageway.

2. A pressurized plunger for clearing an obstruction from a pipe that has an exposed, open end communicating with a receptacle, said receptacle having walls abutting said open pipe end, which comprises: (1) means for supporting a cartridge of compressed gas, said cartridge having an outlet neck terminating in a closure member; (2) a resilient sealing member attached to the cartridge supporting means and adapted to fit snugly against said abutting receptacle walls to form a substantially airtight seal therewith, said sealing member having an orifice therethrough; (3) an air stream guide member positioned between the cartridge and the sealing member, said air stream guide member carrying means for puncturing said neck closure of the cartridge to produce an opening of restricted size and cause a narrow stream of gas to escape therefrom, and having a narrow elongated passageway therethrough, said passageway having an inlet end and an outlet end, said inlet end being adapted to communicate directly with said restricted opening after the opening is completely formed by action of the puncturing means, and said outlet end communicating with the orifice of the sealing member; (4) means carried by the cartridge supporting means and the sealing member for bringing the cartridge and the puncturing means into operative engagement and (5) resilient means for confining in a space no larger in cross-section than the external cross-sectional area of said puncturing means, and no longer along its axis than the length of said puncturing means, for any period of time during which the puncturing means has not yet fully pierced said neck closure, the stream of gas from the punctured cartridge, and for introducing said stream of gas directly into the inlet end of the air stream guide member passageway, said puncturing means and resilient confining means being fixed with respect to each other.

References Cited in the file of this patent
UNITED STATES PATENTS

| | | |
|---|---|---|
| 2,626,404 | Marks | Jan. 27, 1953 |
| 2,939,154 | Gasser | June 7, 1960 |
| 2,999,264 | Stearns | Sept. 12, 1961 |